United States Patent [19]

Krouse et al.

[11] Patent Number: 5,215,503

[45] Date of Patent: Jun. 1, 1993

[54] MOLDED PLASTIC SHAFT EXTENSION FOR DOUBLE INSULATED APPARATUS

[75] Inventors: Jeffrey E. Krouse, Carlisle; Gary M. Marcy, Mechanicsburg; David Finkenbinder, Newville, all of Pa.

[73] Assignee: General Signal Corporation, Stamford, Conn.

[21] Appl. No.: 891,898

[22] Filed: Jun. 1, 1992

[51] Int. Cl.$^5$ ............................................. F16H 55/00
[52] U.S. Cl. .................................... 474/153; 474/166
[58] Field of Search ............... 474/152, 153, 166, 187; 403/118

[56] References Cited

U.S. PATENT DOCUMENTS 4,917,529  4/1990  Hishida ........................ 474/166 X
5,064,406  11/1991  Schutte ............................ 474/166
5,163,883  11/1992  Bradfield ........................... 474/166

Primary Examiner—Thuy M. Bui
Attorney, Agent, or Firm—Milton E. Kleinman; Robert R. Hubbard; Robert S. Smith

[57] ABSTRACT

Apparatus for double insulation of a motor output shaft and providing physical coupling which includes an elongated plastic resin member that includes apparatus for coupling to an associated motor shaft and apparatus for cooperation with an associated power transmission apparatus. In some forms of the invention the apparatus for cooperation with an associated power transmission apparatus includes opposed flat surfaces. In other forms of the invention the apparatus for cooperation with an associated power transmission apparatus includes apparatus for engaging a belt. The appatatus for engaging a belt may include two coaxial truncated cones disposed with the respective larger diameter ends thereof in end abutting relationship to define a crowned axial section. In other forms of the invention the apparatus for engaging a belt includes two axially aligned truncated conical sections disposed with the respective smaller diameter ends thereof disposed in end abutting relationship.

19 Claims, 2 Drawing Sheets

MOLDED PLASTIC SHAFT EXTENSION FOR DOUBLE INSULATED APPARATUS

BACKGROUND OF THE INVENTION

The invention relates to small electric motors and particularly to double insulated motors and double insulated apparatus. The term "double insulated apparatus" refers to apparatus having two independent and redundant insulating layers. Apparatus incorporating double insulation typically do not have a separate ground pin on the electric plug. Applications for the present invention include vacuum cleaners, lawn mowers, hair dryers and other motor driven appliances.

The prior art includes open ended plastic sleeves that are disposed around the output shaft of typical prior art double insulated motors. Such sleeves typically will engage a cylindrical output shaft. They will not, however, provide both the necessary insulation and also conform to shafts having an irregular exterior surface.

Conventional coupling methods do not allow the use of sleeves as shown in FIG. 1 on intricate coupling forms because the sleeve will not conform to the geometry of the drive surface.

A primary object of the invention is to provide apparatus that will provide better insulation for the output shaft of an associated motor.

It is an object of the invention to provide apparatus that will in various form facilitate the physical coupling of a plurality of mechanisms to the motor.

It is another object of the invention to provide apparatus which is inexpensive to manufacture as well as requires a minimum of labor to install.

Still another object of the invention is to provide apparatus that will not only provide the necessary double insulation while still being capable of being formed in a variety of shapes.

SUMMARY OF THE INVENTION

It has now been found that these and other objects of the invention may be attained in apparatus for double insulation of a motor output shaft and providing physical coupling which includes an elongated plastic resin member including means for coupling to an associated motor shaft and means for cooperation with an associated power transmission apparatus.

In some forms of the invention the means for cooperation with an associated power transmission apparatus includes opposed flat surfaces. In other forms of the invention the means for cooperation with an associated power transmission means includes means for engaging a belt. The means for engaging a belt may include two coaxial truncated cones disposed with the respective larger diameter ends thereof in end abutting relationship to define a crowned axial section. In other forms of the invention the means for engaging a belt includes two axially aligned truncated conical sections disposed with the respective smaller diameter ends thereof disposed in end abutting relationship.

The means for cooperation with an associated power transmission means may include a plurality of elongated slots disposed in mutually parallel relationship, each of the slots being disposed in parallel relationship to the axis of the extension. Each of the slots may be disposed in a generally cylindrical surface.

The means for cooperation with an associated power transmission apparatus may include at least one shoulder to bias the belt into a preferred position. In some forms of the invention the power transmission means may include a drive surface having an axial taper. The means for coupling to an associated motor shaft may include a threaded surface.

BRIEF DESCRIPTION OF THE DRAWING

The invention will be better understood by reference to the accompanying drawing in which.

DESCRIPTION OF THE PREFERRED EMBODIMENT

Figure 1:
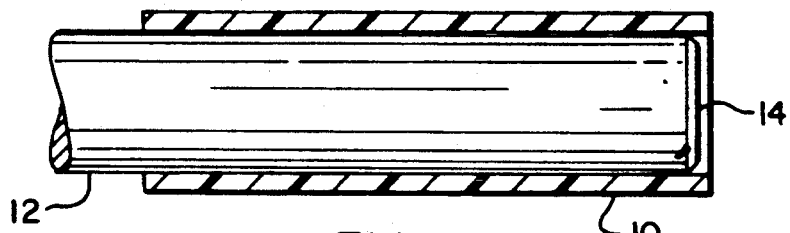
FIG. 1 is a side elevational view in partial section of the prior art extruded sleeve installed on the output shaft of a motor.

Referring now to the drawing there is shown a prior art sleeve 10 installed on a motor output shaft 12. Typically the output shaft 10 is not covered at the axial extremity 14 thereof. The failure to cover the axial extremity of the shaft 12 is potentially a risk for the repairman or others who touch the axial extremity 14 of the motor in the event that power is connected to the motor and there is an electrical short in the motor.

The shaft extension 20 in accordance with one form of the invention is manufactured from a thermoset polyester resin. Internal threads 22 cooperate with external threads 24 on the associated output 26. It will be understood that although the shaft 26 is provided with external threads 24 that in other forms of the invention the output shaft may have another means for coupling to the extension 20. For example the shaft may have a flat machined into the side thereof or be splined or have some other coupling means formed therein. In each case the extension 20 is dimensioned and configured to cooperate with the shaft 26.

Figure 2:
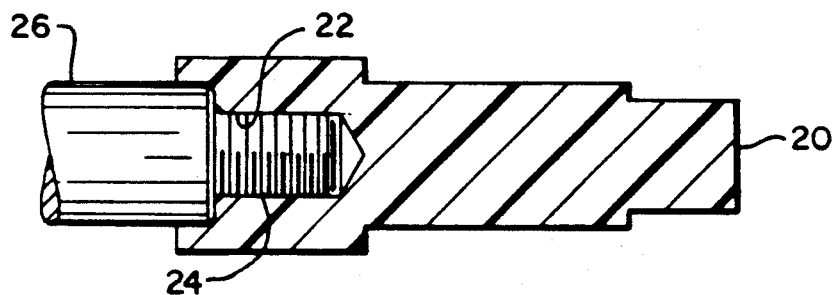
FIG. 2 is a side elevational view of the shaft extension apparatus in accordance with one form of the invention installed on a motor output shaft.
Figure 3:
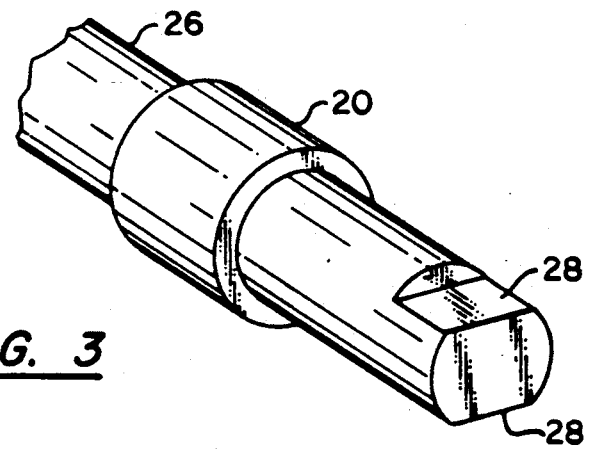
FIG. 3 is a perspective view of the shaft extension shown in FIG. 2 mounted a motor output shaft.
Figure 4:
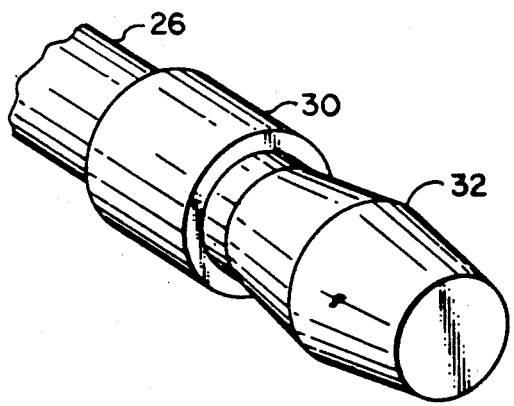
FIGS. 4–7 are perspective views of alternative forms of the shaft extension in accordance with various forms of the invention.
Figure 5:
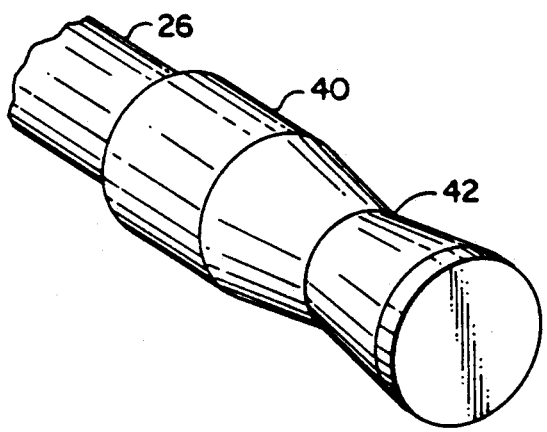

The extension 20 shown in FIGS. 2 and 3 is provided with a opposed flat faces 28, 28 for cooperation with apparatus to be driven such as a fan, compressor or any of various other apparatus.

The extensions 20 may have any of various forms. For example, the forms may be any of those shown in FIGS. 4–7. The extension 30 is adapted for engaging a belt (not shown). A crowned axial section 32 is intended for cooperation with the associated belt and will tend to cause a flat belt to maintain alignment in the conventional manner.

The extension 40 is also particularly adapted for cooperation with a belt. In this embodiment an axial portion 42 has a smaller diameter than the adjacent axial sections. Stated another way, the belt engaging surface is composed of two axially aligned truncated conical portions disposed with the smaller parts thereof disposed in end abutting relationship.

Figure 6:
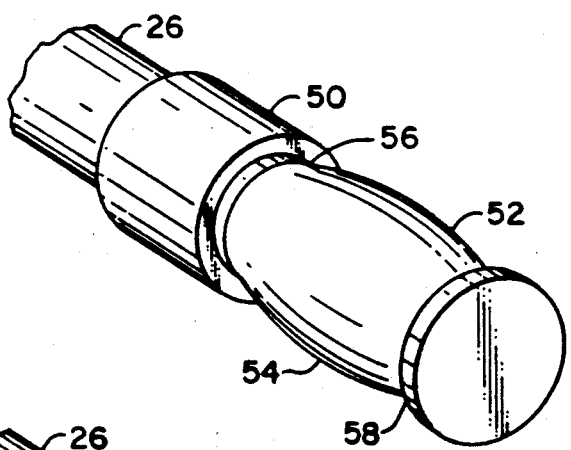

Another embodiment of the invention is shown in FIG. 6. The extension 50 is also intended for use as a belt drive. The drive portion 52 has a maximum diameter at the axial midpoint 54 thereof and tapers smoothly from the axial midpoint 54 to two axially spaced minimum diameter axial sections 56, 58. As will be seen by the drawing the minimum diameter sections 56, 58 are each spaced the same distance from the axial midpoint 54. The minimum diameter axial sections are disposed adjacent to respective shoulders 57, 59 that are intended to prevent movement along the axial extent of the drive portion 52.

Figure 7:
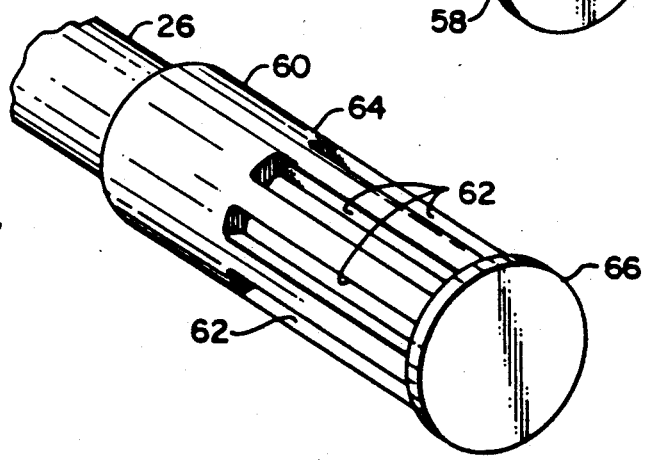

The drive 60 shown in FIG. 7 is particularly adapted for use with a gear or toothed belt (not shown). The drive surface 60 includes a plurality of axially extending circumferentially disposed slots 62 in a cylindrical surface 64. A shoulder 66 prevents movement of the belt (not shown) along the axial extent of the drive surface 60. In some embodiments of the invention the drive surface 60 may have a slight axial taper to urge the belt against the shoulder 66.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention we claim:

1. Apparatus for double insulation of a motor output shaft and providing physical coupling which comprises:
an elongated plastic resin member including means for coupling to an associated motor shaft and means for cooperation with an associated power transmission apparatus.

2. The apparatus as described in claim 1 wherein:
said means for cooperation with an associated power transmission apparatus includes opposed flat surfaces.

3. The apparatus as described in claim 2 wherein:
said means for cooperation with an associated power transmission means includes means for engaging a belt.

4. The apparatus as described in claim 3 wherein:
said means for engaging a belt includes two coaxial truncated cones disposed with the respective larger diameter ends thereof in end abutting relationship to define a crowned axial section.

5. The apparatus as described in claim 3 wherein:
said means for engaging a belt includes two axially aligned truncated conical sections disposed with the respective smaller diameter end thereof disposed in end abutting relationship.

6. The apparatus as described in claim 5 wherein:
the means for cooperation with an associated power transmission means includes a plurality of elongated slots disposed in mutually parallel relationship, each of said slots being disposed in parallel relationship to the axis of said extension.

7. The apparatus as described in claim 6 wherein:
each of said slots is disposed in a generally cylindrical surface.

8. The apparatus as described in claim 6 wherein:
said means for cooperation with an associated power transmission means includes at least one shoulder to bias said belt into a preferred position.

9. The apparatus as described in claim 8 wherein:
said means for cooperation with an associated power transmission means includes a drive surface having an axial taper.

10. The apparatus as described in claim 1 wherein:
said means for coupling to an associated motor shaft includes a threaded surface.

11. The apparatus as described in claim 2 wherein:
said means for coupling to an associated motor shaft includes a threaded surface.

12. The apparatus as described in claim 3 wherein:
said means for coupling to an associated motor shaft includes a threaded surface.

13. The apparatus as described in claim 4 wherein:
said means for coupling to an associated motor shaft includes a threaded surface.

14. The apparatus as described in claim 5 wherein:
said means for coupling to an associated motor shaft includes a threaded surface.

15. The apparatus as described in claim 6 wherein:
said means for coupling to an associated motor shaft includes a threaded surface.

16. The apparatus as described in claim 7 wherein:
said means for coupling to an associated motor shaft includes a threaded surface.

17. The apparatus as described in claim 8 wherein:
said means for coupling to an associated motor shaft includes a threaded surface.

18. The apparatus as described in claim 9 wherein:
said means for coupling to an associated motor shaft includes a threaded surface.

19. The apparatus as described in claim 9 wherein:
said means for coupling to an associated motor shaft includes a threaded surface.

* * * * *